United States Patent Office 3,494,435
Patented Feb. 10, 1970

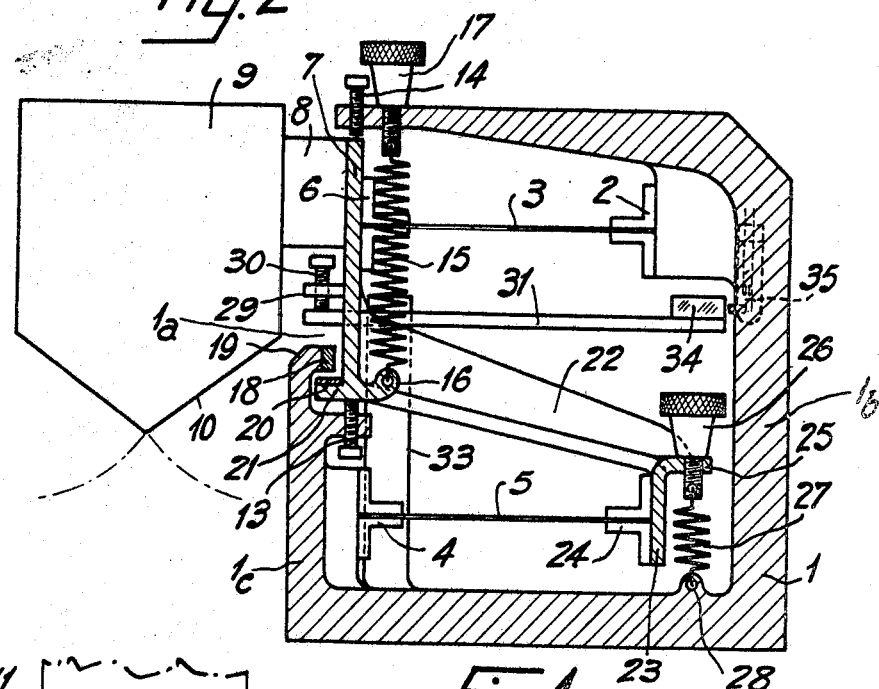
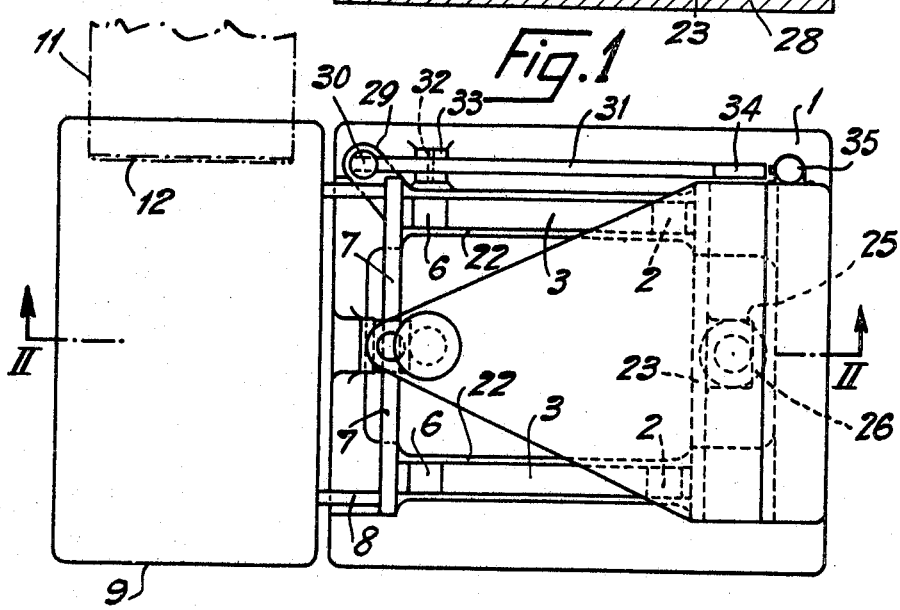

3,494,435
LOAD SENSOR FOR AN AUTOMATIC BATCH WEIGHER
Basile Rouban, Clamart, France, assignor to Trayvou S.A., Vincennes, Val-de-Marne, France, a French body corporate
Filed June 28, 1967, Ser. No. 649,511
Claims priority, application France, July 1, 1966, 67,889
Int. Cl. G01g 13/16
U.S. Cl. 177—110     2 Claims

ABSTRACT OF THE DISCLOSURE

For an automatic batch weigher, a load sensor is provided whereby to reduce the interval between the time at which the predetermined load is achieved and the time at which further supply of material is cut off.

---

Batch weighers for weighing out constant quantities of powdery or granular products delivered in bulk, inter alia for processing, usually comprise a distributor under the control of a balance; the latter having facilities for interrupting product distribution when the load collected becomes equal to some calibrated predetermined weight value. Since distribution cannot cease immediately, some excess of the product is added to the collected load at cutoff. Since this excess quantity has not been batch weighed and, in order to comply with statutory tolerances the batch weighers are adjusted to reduce the excess quantity to a minimum, with detriment to the rhythm of operation. This distribution of excess product is largely due to the inertia of the weighing instrument.

It is the object of the present invention to provide a load sensor to reduce, by simple means, the response time, that is, the time interval between the time at which the required load value is reached and the time at which distribution is cut off.

According to this invention, a load sensor for an automatic batch weigher comprises a moving system associated with a facility for interrupting feeding of the product to be weighed, the moving system being suspended from a frame by means of resilient strips disposed in two sets, one set being disposed below the other set, the strips being parallel to each other, one end of each strip being secured to the frame, the other end of each strip being secured to the moving system, the connections to the frame of the strip ends in one set thereof being at the opposite side of the frame to the connections to the frame of the strip ends in the other set thereof, so that all of the strips are placed in tension by the load applied to the moving system.

The load sensor is given, by construction, a very short oscillation period, for instance, of the order of a fraction of a second, for a very small travel, for instance, of the order of a few tenths of a millimetre, of its moving system. The apparatus combines good accuracy with high sensitivity.

To further shorten the weighing procedure, the moving system may have associated with it an accelerating facility provided by a permanent magnet and a magnetic member disposed one on the frame and the other on the moving system, so that the air gap therebetween increases when, upon the load having becomes sufficient to overcome the calibrated predetermined weight value, the moving system moves. The reason for the accelerating effect of this latter feature is that, until the moving system moves, the magnet applies to the magnetic member a constant force representing a proportion of the calibrated weight value, but immediately the moving system moves, so that the air gap increases, the attraction of the magnet for the magnetic member decreases, so that the moving system, to which a decreasing calibrated weight value is applied, can accelerate.

One embodiment of the invention is shown in the accompanying drawings, wherein:
FIG. 1 is a plan view; and
FIG. 2 is a sectional elevation, taken on the line II—II in FIG. 1.

The apparatus shown in the drawings comprises a frame 1 whose central portion, in elevation, substantially resembles a letter G, and which has at the top of its substantially vertical wall 1b opposite an opening 1a in the frame, two lateral supports 2 to each of which there is attached one end of resilient strips 3.

Two more lateral supports 4 are formed at the bottom of the opposite substantially vertical wall 1c, below the opening 1a, and to each of the supports 4 there is attached one end of resilient strips 5. The two strips 5 extend from the supports 4 in the opposite direction to the extension of the strips 3 from the supports 2.

The strips 3 and 5 are parallel to one another when in the normal state, and are of the same length.

At their other ends, remote from the supports 2, the strips 3 are secured in supports 6 which are rigidly secured to a substantially vertical member 7 provided with arms 8 which carry a receptacle 9, for the products which are to be weighed, which has an opening bottom 10 and which is disposed below a distributor 11. The distributor 11 is indicated diagrammatically in FIG. 1 and is provided with a facility, such as a moving flap 12, for interrupting distribution therefrom. The member 7 can move vertically between two adjustable abutments provided by screws 13, 14 engaged in taped holes in the frame 1. A spring 15, connected between a bracket 16 on the member 7 and an adjusting screw 17 disposed on the frame 1, tends to urge the member 7 towards the top abutment screw 14. Cumulative with the action of spring 15 is the action of a magnetised bar 18 which is secured to a bracket 19 on the frame 1 and which is associated with a magnetic member 20 secured to a projection 21 on the member 7, the projection 21 and member 20 extending beneath the bar 18.

The member 7 also is provided with two arms 22, extending towards the frame wall 1b, interconnected by a cross-member 23 having secured to it supports 24 to which the ends of the strips 5 remote from the supports 4 are secured. Because of the opposite direction extension of the strips 3 and 5 from their respective fixed supports 2 and 4, the strips are all placed in tension by a load supplied by the receptacle 9 and its contents.

The cross-member 23 is provided with a lug 25 in which an adjusting screw 26 is screwed, and a spring 27 is secured by its ends to a lug 28 on the frame 1 and to the screw 26. The spring 15 and screw 17 effect coarse calibration adjustment of the predetermined weight value, and the spring 27 and screw 26 serve for fine adjustment of the said value.

On one side of the member 7 is an inclined lug 29 in which an adjusting screw 30 is screwed. Bearing up against the screw 30 from below is one arm of a lever 31 which is pivoted at 32 in a fork 33 mounted on the frame 1; the other arm of the lever 31 has mounted upon it a magnet 34 which moves past a magnetic contactor 35 which is mounted on the frame 1 and which is adapted to actuate means operating to close the distributor 11 when the magnet 34 rises, for example, to the position shown in FIG. 2.

The mechanical characteristics of the strips 3, 5 are so determined that the moving system formed by the member 7, the receptacle 9 and the load has a predetermined oscillation frequency which is fairly high, for instance, something like 10 cycles per second for a load of 500 grams. As already stated, the calibrated predetermined weight value is determined by the forces of the springs 15, 27 and by the action of the magnet 18. The possible amplitude of movement of the member 7 is small, for example, in the region of a few tenths of a millimetre.

The apparatus operates as follows:

When in the inoperative state, the moving system is urged upwards by the springs 15 and 27, and the member 7 abuts the screw 14, and the magnet 34 is in its bottom position in which it has no effect on the contactor 35. The air gap between the magnet 18 and the magnetic member 20 is at a minimum and the action of the magnet 18 on the member 20 is at a maximum.

When the load discharged into the receptacle 9 becomes sufficient to overcome the calibrated weight value formed by the resultant of the actions of the springs 15, 27 and of the magnet 18, the moving system drops. The action of the magnet 18, and therefore of the calibrated weight value, decreases in proportion as the air gap between the magnet 18 and member 20 increases, and so the magnet 18 serves as a drop accelerator, giving very fast rebound-free operation.

The moving system descends; at its own oscillation frequency which, as already stated, can be fairly high, it operates the lever 31 and magnet 34, and therefore the contactor 35 which causes the feeding of the receptacle 9 to be interrupted.

Distribution can be interrupted very rapidly, for instance in something like 0.1 second. If the products being dealt with are, for instance, alimentary pastes in pieces of from 7 to 8 mm. long, a batch of 500 grammes can be determined to an accuracy of 5 grammes in something like 1 second.

The rate of operation of the apparatus can be very fast.

What I claim and desire to secure by Letters Patent is:

1. A load sensor for an automatic batch weigher, comprising a moving system associated with a facility for interrupting feeding of the product to be weighed, the moving system being suspended from a frame by means of resilient strips disposed in two sets, one set being disposed below the other set, the strips being parallel to each other, one end of each strip being secured to the frame, the other end of each strip being secured to the moving system, the connections to the frame of the strip ends in one set thereof being at the opposite side of the frame to the connections to the frame of the strip ends in the other set thereof, so that all of the strips are placed in tension by the load applied to the moving system.

2. A load sensor according to claim 1, characterised in that it comprises a movement-accelerating facility provided by a permanent magnet and a magnetic member disposed one on the frame and the other on the moving system, so that the air gap therebetween increases when, upon the load having become sufficient to overcome the calibrated predetermined weight value, the moving system moves.

References Cited

UNITED STATES PATENTS

| | | | |
|---|---|---|---|
| 2,646,274 | 7/1953 | Weckerly | 177—229 X |
| 3,236,321 | 2/1966 | Katagiri et al. | 177—110 X |
| 3,379,267 | 4/1968 | Mackenzie | 177—108 |

RICHARD B. WILKINSON, Primary Examiner

G. H. MILLER, JR., Assistant Examiner

U.S. Cl. X.R.

177—229, 255